United States Patent
Privalov

(10) Patent No.: US 7,680,297 B2
(45) Date of Patent: Mar. 16, 2010

(54) FIRE DETECTION METHOD AND APPARATUS

(75) Inventor: George Privalov, Baltimore, MD (US)

(73) Assignee: Axonx Fike Corporation, Blue Springs, MO (US)

( * ) Notice: Subject to any disclaimer, the term of this patent is extended or adjusted under 35 U.S.C. 154(b) by 662 days.

(21) Appl. No.: 11/130,880

(22) Filed: May 17, 2005

(65) Prior Publication Data

US 2005/0271247 A1     Dec. 8, 2005

Related U.S. Application Data

(60) Provisional application No. 60/572,056, filed on May 18, 2004.

(51) Int. Cl.
G06K 9/00 (2006.01)
G06K 9/62 (2006.01)
G08B 17/12 (2006.01)

(52) U.S. Cl. .................. 382/100; 382/160; 340/577
(58) Field of Classification Search .............. 382/100; 340/578
See application file for complete search history.

(56) References Cited

U.S. PATENT DOCUMENTS

| | | | | |
|---|---|---|---|---|
| 3,973,852 A | 8/1976 | Moore et al. | ............ | 356/207 |
| 4,170,264 A | 10/1979 | Gibson | ............ | 169/24 |
| 4,875,526 A | 10/1989 | Latino et al. | ............ | 169/24 |
| 5,153,722 A | 10/1992 | Goedeke et al. | ............ | 358/108 |
| 5,719,557 A | 2/1998 | Rattman | ............ | 340/628 |
| 5,751,209 A | 5/1998 | Werner | ............ | 340/286.05 |
| 5,832,187 A | 11/1998 | Pedersen et al. | ............ | 395/50 |
| 5,838,242 A | 11/1998 | Marsden | ............ | 340/628 |
| 5,850,182 A | 12/1998 | Schuler | ............ | 340/578 |
| 5,926,280 A | 7/1999 | Yamagishi et al. | ............ | 356/390 |
| 5,995,008 A | 11/1999 | King et al. | ............ | 340/578 |
| 6,184,792 B1 | 2/2001 | Privalov et al. | ............ | 340/578 |
| 6,285,291 B1 | 9/2001 | Knox et al. | ............ | 340/634 |
| 7,002,478 B2 * | 2/2006 | Moore et al. | ............ | 340/577 |
| 7,155,029 B2 * | 12/2006 | King et al. | ............ | 382/100 |
| 7,286,704 B2 * | 10/2007 | Pfefferseder et al. | ............ | 382/181 |

* cited by examiner

*Primary Examiner*—Bhavesh M Mehta
*Assistant Examiner*—Hadi Akhavannik
(74) *Attorney, Agent, or Firm*—Hovey Williams LLP

(57) ABSTRACT

The present invention provides a method and apparatus for detecting fire in a monitored area even if the flames are hidden behind obstructing objects. The steps of this method include: (a) detecting and capturing, at a prescribed frequency, video images of the monitored area, (b) converting the captured images into two-dimensional bitmaps of the temporally varying brightness values observed in the captured images, wherein the spatial resolution of this bitmap is determined by the number of pixels comprising the bitmaps, (c) specifying for any two of the pixels in the bitmaps a temporal coherence factor whose magnitude is a measure over a prescribed time of the similarities observed in the temporal variations of the brightness values being captured at each of the bitmap's pixels, (d) computing this temporal coherence factors for each of the prescribed set of pixels in the captured images, and (e) analyzing the computed temporal coherence factors to identify those sets of pixels that have temporal coherence factors whose values are above a prescribed threshold value, wherein this prescribed threshold value is set so as to identify those pixels that correspond to regions of the monitored area whose temporal variations in brightness indicate that the source of this brightness is a fire in the monitored area.

18 Claims, 4 Drawing Sheets

FIRE DETECTION METHOD AND APPARATUS

CROSS-REFERENCE TO RELATED APPLICATION

This application claims the benefit of U.S. Provisional Patent Application No. 60/572,056, filed May 18, 2004 by the same inventor.

BACKGROUND OF THE INVENTION

1. Field of the Invention

The present invention generally relates to electrical, condition responsive systems and methods. More particularly, this invention relates to a method and apparatus for detecting fire in a monitored area by detecting the light emission patterns of flames in the monitored area as a result of the detailed, computational analysis of a sequence of digitized images of the monitored area.

2. Description of the Related Art

Fire detectors are very important safety devices that can provide early warning of fire in a monitored area. Considerable efforts have been devoted to improving upon the technology used in fire detectors as a means of increasing their usefulness and reliability.

One of the most commonly used methodologies for fire detection is based on the light scattering properties of smoke or suspended aerosol particles that are generated by a fire. However, a disadvantage of this approach is that it assumes that smoke from a fire will find its way to a sensor at an instant in the fire's progression when there is still time for action to be taken to put out the fire before excessive damage occurs.

Another common fired detection method tries to overcome this limitation by directly measuring the light that is radiated by a fire. Such methods involve direct light emission measurements with the goal of identifying the variations of illumination intensities that are attributable to the turbulent flickering of flames.

Furthermore, it has been found that the reliability of this method can be greatly enhanced if such illumination intensities are measured in spectral or wavelength ranges that are characteristic of particular combustion processes. In particular, often the range around 4.5 µm is used because of the emission of CO radicals at this wavelength. This technique allows for reducing the sensitivity of such a system to light sources that are not caused by combustion (e.g., electric light, reflections of sunlight).

However, a possible disadvantage of this approach is that its sensitivity is optimized for only particular types of fuels. Thus, use of devices based on this methodology is usually limited to environments where probable fires could be caused by only a limited number of materials (i.e., natural gas, oil, methanol). To address this limitation, it has been suggested that a plurality of sensors be used wherein each sensor works at only a specific wavelength of interest. See King et al., U.S. Pat. No. 5,995,008, and Shuler, U.S. Pat. No. 5,804,825.

Another disadvantage of this approach is that the sensors that are used with such methodologies are highly sensitive to the distance between the source of radiation (flames) and the actual sensor element. Thus, the areas that can be monitored by these devices can be quite limited in size (i.e., since making their sensitivity high so as to cover a greater area can result in false alarms). It is common practice to place these devices only in close proximity to installations that pose high fire risks. Additionally, the relatively high cost of such sensors prevents the use of a great number of them to monitor large production and commercial spaces.

An alternative approach for fire detection utilizing television cameras was suggested by Okamoto et al. in U.S. Pat. No. 6,680,671. In this approach, the averaged intensity of all pixels in a monitored area is analyzed in search of particular flame-indicative, flickering patterns. However, this approach does not utilize the reliability enhancing technique of analyzing such data in spectral or wavelength ranges that are characteristic of particular combustion processes. Thus, the performance of this method is below that of other traditional methods.

Another, alternative approach is to utilize the sophisticated imaging techniques to detect fire by identifying its characteristic light patterns within the digitized images of monitored areas with the use of specialized software algorithms; see Privalov et al., U.S. Pat. No. 6,184,792. This method provides a means of early fire detection within the framework of standard CCTV surveillance systems, and it is insensitive, within a monitoring camera's allowable range, to the distance between the camera and a light source which may be due to the presence of a fire. However, a significant disadvantage of this method is that it can be only employed when flames are directly visible by the imaging device. Any obstruction in the line of site between camera and flames will prevent a fire from being detected.

Despite the considerable prior art relating to radiation fire detectors, there is still a need for fire detector methods and systems that can more effectively detect fire independent of the types of combustibles being consumed, while also providing uniform monitoring sensitivity across an entire observation area. Inexpensive technologies that can provide such fire detection improvements can significantly affect public safety in general.

OBJECTS AND ADVANTAGES

There has been summarized above, rather broadly, the prior art that is related to the present invention in order that the context of the present invention may be better understood and appreciated. In this regard, it is instructive to also consider the objects and advantages of the present invention.

It is an object of the present invention to provide apparatus and methods that are effective in detecting fire within the entire volume of a monitored area.

It is another object of the present invention to provide apparatus and methods that are effective at detecting fire in industrial petrochemical installations.

It is a further object of the present invention to provide apparatus and methods that can overcome the deficiencies of prior optical fire detection systems that are associated with their performance limitations when obstructions are in the line of site between camera and any flames in a monitored area.

It is an object of the present invention to provide apparatus and methods that can operate within the framework of the ordinary Closed Circuit Television (CCTV) surveillance systems that are used to monitor commercial, outdoor, industrial and residential areas.

It is yet another object of the present invention to demonstrate how existing security surveillance equipment may be combined into unique systems which provide an improved best means for addressing the detection of fire in the industrial, commercial and residential installations.

It is a further object of the present invention to provide a means for providing notification of fire within a monitored area to remote operators who are using closed circuit television to remotely monitor the area.

These and other objects and advantages of the present invention will become readily apparent as the invention is better understood by reference to the accompanying summary, drawings and the detailed description that follows.

SUMMARY OF THE INVENTION

Recognizing the need for the development of improved fire detection systems and methods, the present invention is generally directed to satisfying the needs set forth above and overcoming the disadvantages identified with prior art devices and methods.

In accordance with the present invention, the foregoing need can be satisfied by providing an improved method for detecting fire in a monitored area. The steps of this method include: (a) detecting and capturing, at a prescribed frequency, video images of the monitored area, (b) converting the captured images into two-dimensional bitmaps of the temporally varying brightness values observed in the captured images, wherein the spatial resolution of this bitmap is determined by the number of pixels comprising the bitmaps, (c) specifying for any two of the pixels in the bitmaps a temporal coherence factor whose magnitude is a measure over a prescribed time of the similarities observed in the temporal variations of the brightness values being captured at each of the bitmap's pixels, (d) computing this temporal coherence factors for each of the prescribed set of pixels in the captured images, and (e) analyzing the computed temporal coherence factors to identify those sets of pixels that have temporal coherence factors whose values are above a prescribed threshold value, wherein this prescribed threshold value is set so as to identify those pixels that correspond to regions of the monitored area whose temporal variations in brightness indicate that the source of this brightness is a fire in the monitored area.

A further specific, preferred embodiment of this method of fire detection includes the situation in which the sets of pixels are pairs of adjacent pixels along the horizontal and vertical axes defining the bitmap.

A still further specific, preferred embodiment of this method of fire detection includes the situation in which the temporal coherence factor of any two arbitrary pixels in the bitmaps is the convolution of the time derivative of the brightness values of the pixels.

The present invention discloses the mathematical treatment of the video images which allow one to identify the regions of the image exhibiting the properties typical for objects that reflect the light radiated by flames. Operating a computer algorithm that utilizes the above-mentioned treatment, one can generate a fire alarm when a fire threat has been detected.

Thus, there has been summarized above, rather broadly, the present invention in order that the detailed description that follows may be better understood and appreciated. There are, of course, additional features of the invention that will be described hereinafter and which will form the subject matter of the claims to this invention.

DESCRIPTION OF THE PREFERRED EMBODIMENT

Figure 1:
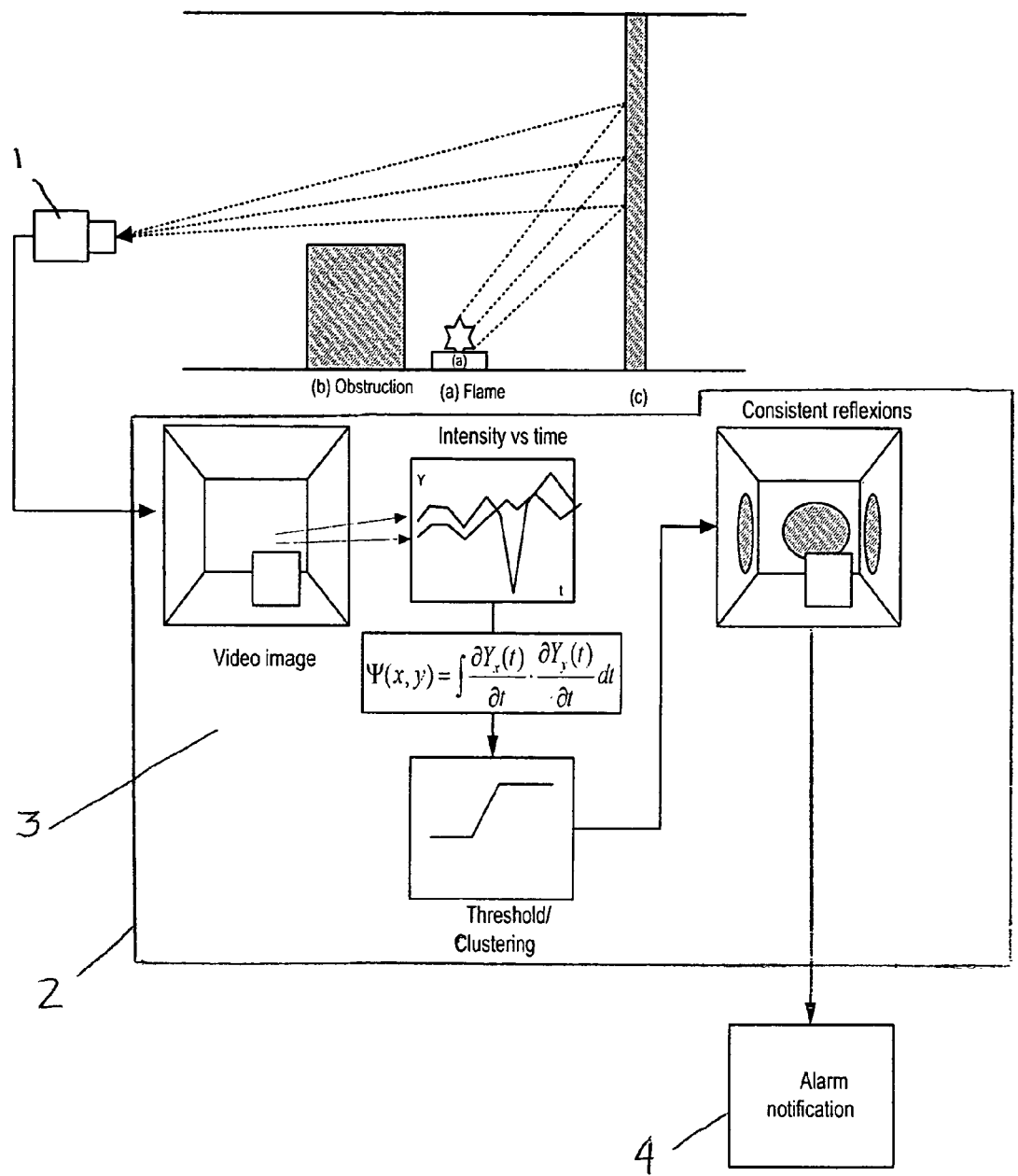
FIG. 1 shows a block diagram of a preferred embodiment of the fire detection method and apparatus of the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

FIG. 1 shows a preferred embodiment of the fire detection method and apparatus of the present invention that can operate within the framework of the ordinary Closed Circuit Television (CCTV) surveillance system for commercial, outdoor, industrial and residential installations.

In a preferred embodiment, the present invention monitors the images being collected from a monitored area so as to form of a series of matrices (bitmaps) collected at a prescribed time interval. Each matrix consists of (n×m) values that represent a brightness value at each point (x, y) within a bitmap.

An open flame, present in the vicinity of the observation area, and not necessarily within direct line of sight of the video camera, creates reflections off the objects present at the scene. These objects may include, but are not limited to walls, desks, shelves, equipment, etc.

Unlike the reflection of other lights sources, the reflections of the light originated from flames has a very specific flickering emission pattern. I have observed that this pattern is characterized by seemingly chaotic modulation of light intensity within the frequency range from 2 to 8 Hz.

Such flickering reflection may be too weak to be visible to the human eye, particularly when the amplitude of flickering reflections are comparable to the noise level of any camera that being used to collect the images of the monitored area. However, unlike any temporally random noise, the reflected flickering flame light is observed to be temporally coherent, since it comes from one source. This coherence results in the flickering intensity from each pixel on all reflective surfaces having similarities in their temporal behaviors or patterns. I have discovered that these temporal similarities can be used to identify an out-of-sight flame.

The fire detection system of the present includes a video imaging and capture device (e.g., a television camera) 1, which is preferably sensitive to radiation in the infrared (IR) range, capable of converting the captured images into two-dimensional bitmaps whose spatial resolution is determined by the number of pixels comprising the bitmaps, and with a field of view that covers the monitored area that may include a flame source (a), obstruction (b) and wall (c). See FIG. 1. It is important to note that this arrangement is given for exemplary purpose only and is not intended to limit the application of the disclosed method.

The captured video images are analyzed with a computer system 2 with adequate analytical capabilities, including the algorithms 3 disclosed herein, to compute a temporal coherence factor for the brightness values present at each pair of adjacent pixels. This computed factor is used to identify the regions of the bitmap or the corresponding monitored area where these coherence factors are predominantly positive.

In a first preferred embodiment, the coherence factor of arbitrary pair of pixels x and y is defined as the convolution of the product of the time derivatives of the brightness of respective pixels:

$$\Psi(x, y) = \int \frac{\partial Y_x(t)}{\partial t} \cdot \frac{\partial Y_y(t)}{\partial t} dt$$

where $Y_x(t)$ and $Y_y(t)$ is a brightness value of the given pixels x and y at any given time t.

To identify the parts of the image belonging to such a reflective area, it is sufficient to compute only two coherence factors for each pixel of coordinate (x, y): a first using the next pixel along x-axis, and a second using the next adjacent pixel along y-axis.

Therefore, for an entire image of size m×n pixels, the matrix of the size m−1×n−1 is generated with each element of this matrix having two values: the first value is the coherence factor between the pixel (x, y) and (x+1, y), and the second value is the coherence factor between pixel (x, y) and (x, y+1).

It should be noted that the analytical technique described above is only one of the many that could be used to identify a surface that is reflecting radiation from a flame that is outside the line-of-sight of a monitoring camera. Thus, the exemplary technique given above should not be interpreted as a limiting analytical technique of the present invention.

Figure 4:
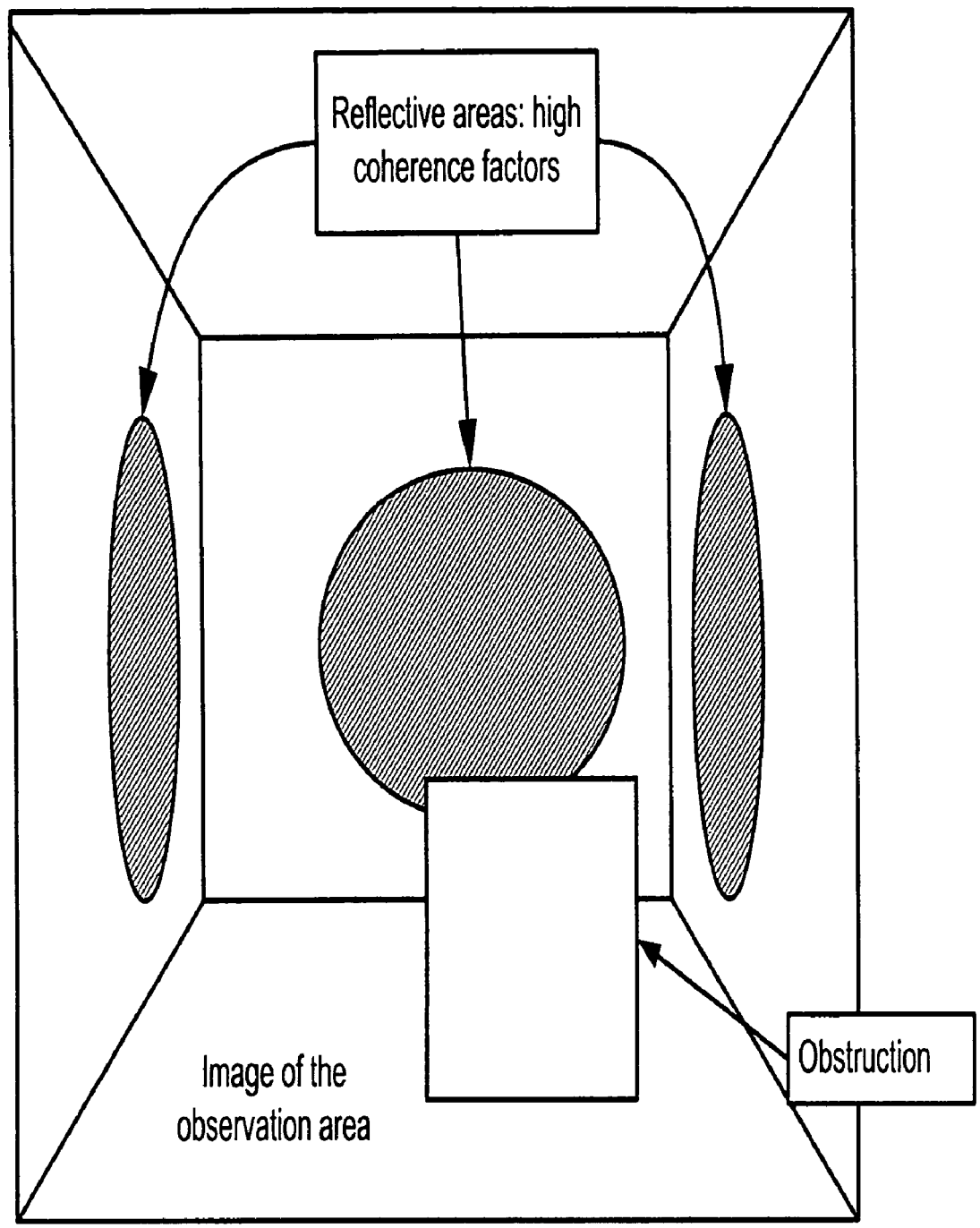
FIG. 4 illustrates the typical reflective patterns in the room as they are identified using the present invention.

The software which expresses the algorithms and analytical procedures 3 of the present invention and which is running on this computer system scans these coherence matrices to identify isolated regions where values are positive and exceed a prescribed threshold value. Those regions are identified as surfaces which are reflecting flame radiation. FIG. 4 illustrates the typical reflective patterns in the room as they are identified using the present invention.

Additionally, it is possible to highlight these regions in the image and further analyze them for their shape, area, time consistency, etc. as a step prior to utilizing an alarm means 4 to send a signal which alerts someone of the presence of a fire in the monitored area. If all such secondary, appropriate conditions are met, proper alarm signals can be issued.

Figure 2:
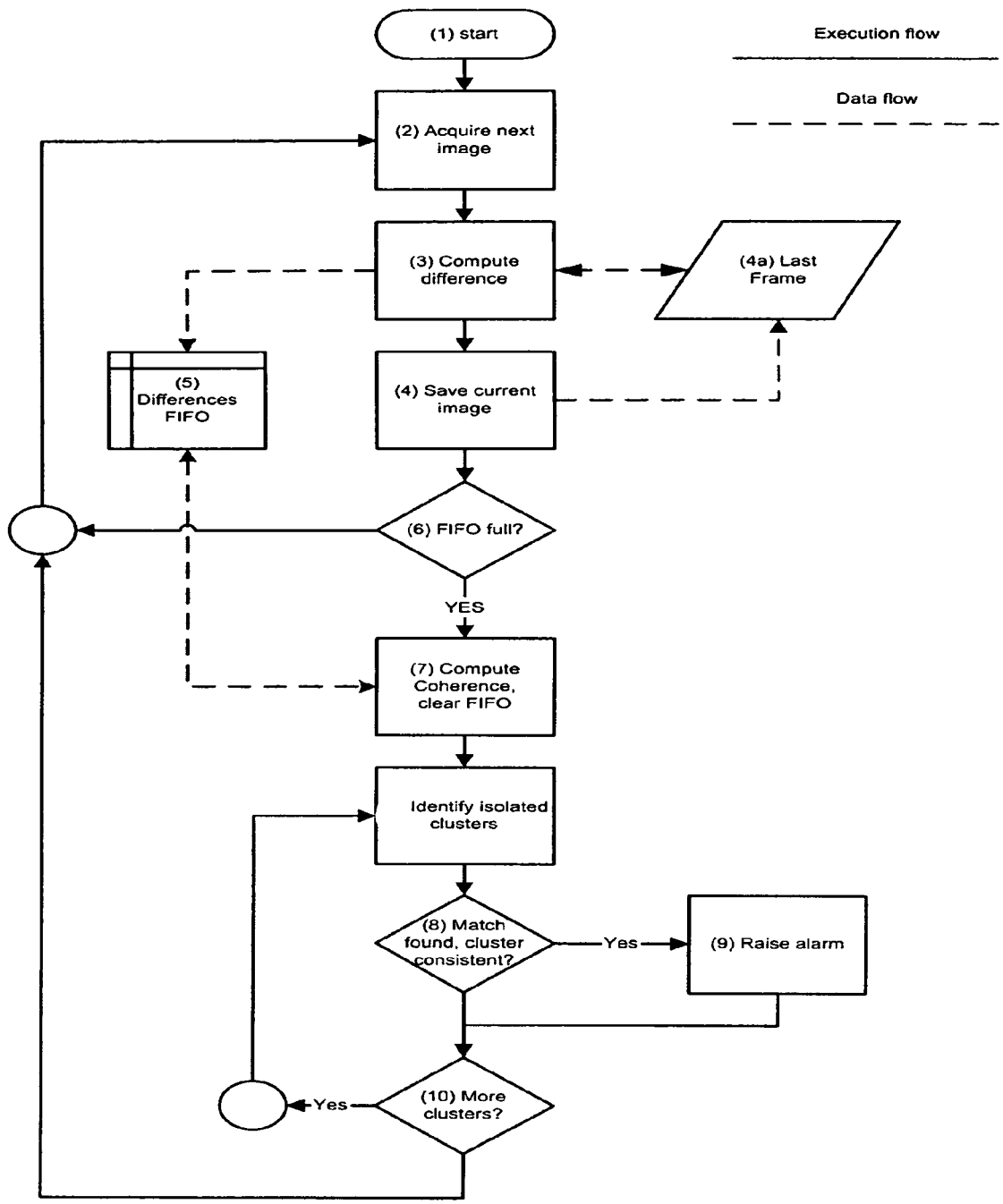
FIG. 2 shows the algorithm of a preferred embodiment of the fire detection method and apparatus of the present invention.

The flowchart of the software algorithm 3 controlling the computer system is presented at FIG. 2. The main cycle of the algorithm starts (1) with acquiring the next frame (2) from the video capturing device in form of the matrix. Each element of this matrix corresponds to the brightness level at a particular pixel. The difference matrix is calculated (3) to reflect the ongoing, instantaneous temporal changes in these brightness level (i.e., the difference in brightness level from a newly acquired image and the previous image). The difference matrix is stored (5) in a FIFO buffer of prescribed size for further computation.

In one representative embodiment of this algorithm, the size of FIFO is set to be sixteen, but that does not preclude other values. The current frame image is also stored (4) in a special buffer to be used in the next cycle of computing temporal brightness changes.

A coherence matrix is compiled each time FIFO is filled (6). Each element of the coherence matrix has two values Mx and My computed as sum across each i-th member of FIFO:

$$Mx_{x,y} = \sum_i \Delta_{x,y}^i \cdot \Delta_{x+1,y}^i \quad My_{x,y} = \sum_i \Delta_{x,y}^i \cdot \Delta_{x,y+1}^i$$

where $\Delta_{x,y}$ are difference values for pixel at position (x, y).

After a coherence matrix is compiled, FIFO is reset (7). Isolated clusters are computed from a coherence matrix using one of the standard computer graphics algorithms, e.g., flood fill or line sweep.

Each cluster that is larger than a prescribed size is considered a candidate for being flame reflection artifact. In some embodiments however, additional tests can be conducted (8) that may include, but are not limited to: consistency in appearance of the clusters for prescribed period of time, shape of the cluster and its particular position relative to other objects in the scene. If all the criteria are met, an alarm is sounded or raised (9).

Other embodiments of the present invention may provide a variety of additional functions, including, but not limited to: feeding video images to a remote operator, highlighting the regions that caused the alarms in these video images, raising sound and light alarms, issuing e-mails and emergency calls to appropriate response units. The steps (7-9) are performed for each isolated cluster found (10).

Figure 3:
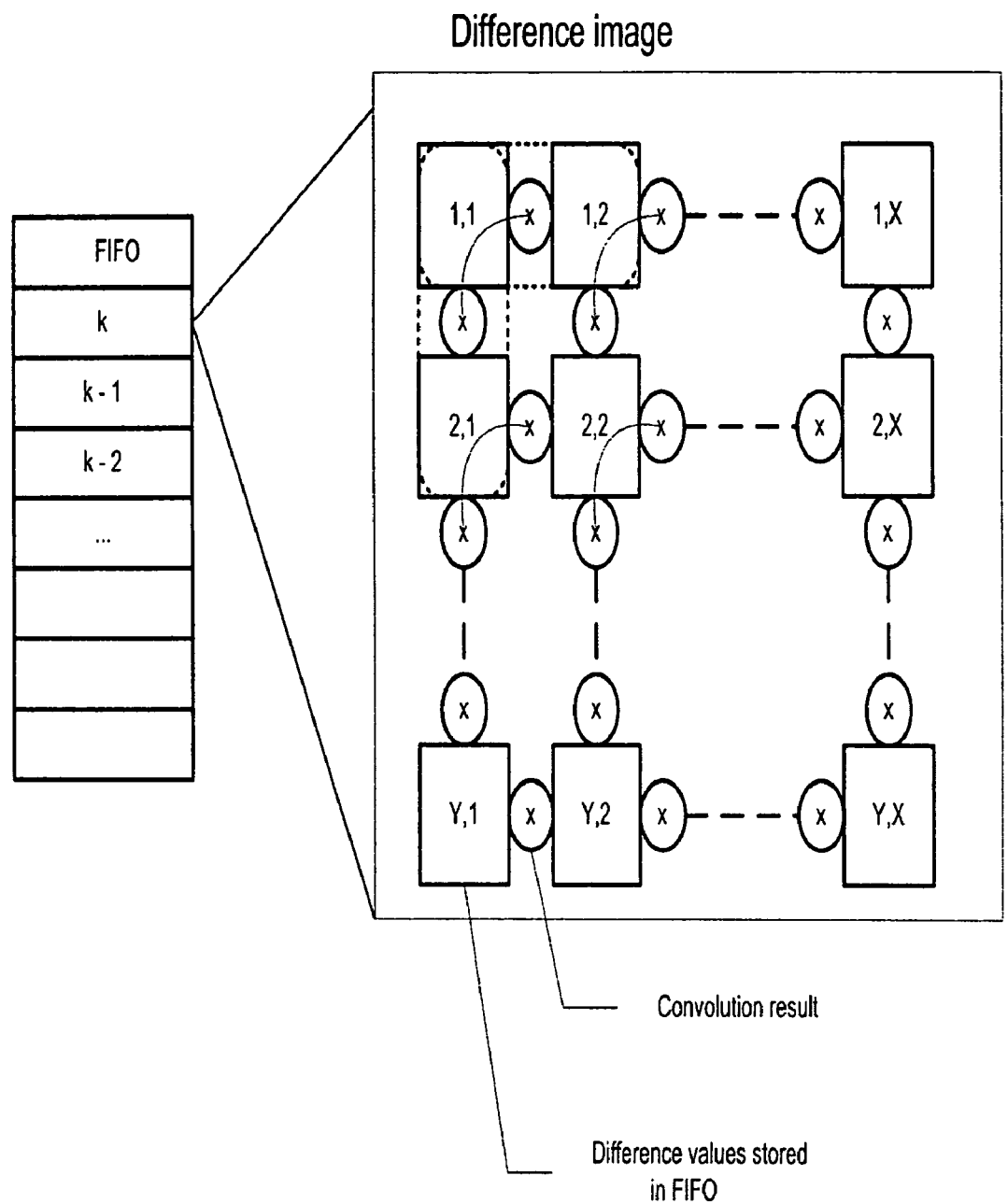
FIG. 3 shows the layout of a FIFO buffer and how the coherence map vectors are calculated.

FIG. 3 illustrates in more details how a coherence matrix can be calculated. FIFO buffer contains k copies of difference images. Each pair of adjacent pixels in such a difference image is used to compute a desired coherence factor. For every pixel position the coherence factor can be compiled using the next pixel on the right and next pixel below. In some embodiments, pixels on the left and above may be used instead. Diagonal patterns also can be employed in yet other embodiments.

It is important to note that it is not necessary to maintain FIFO to compute the coherence factors. In yet another embodiment, the coherence factors can be computed by using a recursive formula:

$$Mx_{x,y} = Mx_{x,y} + \Delta_{x,y} \cdot \Delta_{x+1,y}$$

$$My_{x,y} = My_{x,y} + \Delta_{x,y} \cdot \Delta_{x,y+1}$$

Once the prescribed number of frames is processed, the entire scene is being analyzed, and the matrix is reset to zero.

Alternatively, another embodiment may constantly maintain the coherence factor without need of resetting. The coherence values may be simply updated recursively at every cycle using only current difference image:

$$Mx_{x,y} = (1-a) \cdot Mx_{x,y} + a \cdot \Delta_{x,y} \cdot \Delta_{x+1,y}$$

$$My_{x,y} = (1-a) \cdot My_{x,y} + a \cdot \Delta_{x,y} \cdot \Delta_{x,y+1}$$

where α is a filtering factor, usually a small number α<<1.

In this embodiment, the analysis of coherence matrix can be performed at a much slower rate than update cycle. It is recommended that this analysis not be earlier then once each 1/α period of the frame rate. Other embodiment however, may have the analysis period deviating from above.

Alternatively, some embodiments may employ other ways to calculate the difference image. For example, instead of using strictly a difference in two consecutive frames, one can use the difference between the current frame and a time-averaged frame.

In yet another embodiment, the coherence factors can be calculated directly from a Fourier transform of the brightness of each pixel using a restricted form of the Weiner-Khinchin theorem that says that convolution of two functions is an inverse Fourier transform of a product of the Fourier response of the first function and a complex conjugate of the Fourier response of the second function:

$$\int_{-\infty}^{\infty} a(t+\tau) \cdot b(t) dt \equiv \frac{1}{\sqrt{2\pi}} \int_{-\infty}^{\infty} \exp(-i\omega\tau) \cdot A(\omega) \cdot B^*(\omega) d\omega$$

where $i=\sqrt{-1}$, $A(\omega)$ is frequency response for function $a(t)$, $B^*(\omega)$ is complex conjugate of frequency response of function $b(t)$. For coherence factor time shift $\tau$ will be equal to zero while $\exp(-i\omega r)$ will become 1, and integration over the frequency range can be substituted with the sum:

$$M_{a,b} = \frac{1}{\sqrt{2\pi}} \sum_j \left\{ F_j\left[\frac{\partial y_a(t)}{\partial t}\right] \cdot F_j^*\left[\frac{\partial y_b(t)}{\partial t}\right] \right\}$$

where $y_a(t)$ and $y_b(t)$ are brightness values of pixels a and b and $F_i[\ ]$ denotes a j-th Fourier term.

This equation can be further expanded using the rule for Fourier transform of a derivative:

$$F_j[f'(t)] \equiv 2\pi \cdot i \cdot j \cdot F_j[f(t)]$$

Thus, the coherence factors will become:

$$M_{a,b} = \sqrt{8}\,\pi^{3/2} \sum_j \langle i \cdot j \cdot F_j[y_a(t)] \rangle \cdot \langle i \cdot j \cdot F_j^*[y_b(t)] \rangle$$

Ignoring constant terms, the coherence factors for pixel (x, y) become:

$$Mx_{x,y} = \sum_{j=1}^{n} [i \cdot j \cdot Y_j(x,y)] \cdot [i \cdot j \cdot Y_i^*(x+1, y)]$$

$$My_{x,y} = \sum_{j=1}^{n} [i \cdot j \cdot Y_j(x,y)] \cdot [i \cdot j \cdot Y_j^*(x, y+1)]$$

where $Y_i(x, y)$ is a i-th Fourier term of the brightness $y_{x,y}(t)$:

$$Y_i(x, y) = \frac{1}{\sqrt{2\pi}} \int e^{-2j\cdot\pi\cdot f\cdot i\cdot t} y_{x,y}(t) dt$$

where f is a frame rate, while $Y_i^*(x, y)$ is complex conjugate of abovementioned Fourier term.

It is important to note that this summation ignores a zero Fourier term, leaving out constant bias in brightness values. Due to limited frame rate, only a few Fourier terms will be sufficient for determining the coherent flickering artifacts of a flame radiation.

In yet another embodiment, a Fourier transform can be performed directly on the brightness. When calculating the convolution simply by including only higher Fourier terms, one will eliminate a constant background bias:

$$M_{x,y} = \sum_{j=m}^{n} Y_a \cdot Y_b^*$$

where $Y_j(x)$ and $Y_j(y)$ are j-th terms of Fourier transform of the brightness values of the pixels x and y; m-denotes the lower frequency cutoff term and n-denotes the higher frequency cutoff term. The advantage of this approach is that it may be less sensitivity to the pixel level noise to which the time derivative is known to be sensitive.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as hereinafter set forth in the claims.

I claim:

1. A method of fire detection in a monitored area comprising the steps of:
   detecting and capturing, at a prescribed frequency, video images of said area using a video imaging and capture device,
   converting said captured images into two-dimensional brightness value bitmaps of temporally varying brightness values observed in said images using a computer system, wherein spatial resolution of said bitmaps being determined by a number of pixels comprising said bitmaps,
   converting said brightness value bitmaps into a two-dimensional matrix of temporal similarities between variations of the brightness values captured at each of said pixels and variations of the brightness values captured at a pixel that is adjacent to said pixel for each pixel in said brightness value bitmaps and over a prescribed time period using said computer system, and
   analyzing said matrix to identify clusters of pixels that have temporal similarities whose values are above a prescribed threshold value using said computer system,
   sending a signal to an alarm means to trigger said alarm means when clusters having temporal similarities whose values are above the prescribed threshold value are identified by said computer system,
   wherein said prescribed threshold value is set so as to identify those clusters of pixels that correspond to regions of said monitored area whose temporal variations in adjoining pixel brightness values indicate that the source of said temporal brightness variations is a fire in said monitored area.

2. A method of fire detection as recited in claim 1, wherein said conversion of said brightness value bitmaps to said matrix involves computing for any two pixels in said brightness value bitmaps a convolution of a time derivative of the brightness values of said pixels.

3. A method of fire detection as recited in claim 1, wherein said conversion of said brightness value bitmaps to said matrix involves computing for any pair of pixels in said brightness value bitmaps a sum across a prescribed number of samples of products of brightness differences of said pixels in successive bitmaps.

4. A method of fire detection as recited in claim 1, wherein said conversion of said brightness value bitmaps to said matrix involves for any pair of pixels in said brightness value bitmaps a timed-averaged sum of products of brightness differences of said pixels in successive bitmaps.

5. A method of fire detection as recited in claim 1, wherein said conversion of said brightness value bitmaps to said matrix involves computing for any pair of pixels in said brightness value bitmaps a sum across a prescribed number of samples of products of differences in current brightness value and a time-averaged brightness value of said pixels.

6. A method of fire detection as recited in claim 1, wherein said conversion of said brightness value bitmaps to said matrix involves computing for any pair of pixels in said brightness value bitmaps the time-averaged sum of products of differences in current brightness value and the time-averaged brightness value of the said pixels.

7. A method of fire detection as recited in claim 1, wherein said conversion of said brightness value bitmaps to said matrix involves computing for any pair of pixels in said brightness value bitmaps a sum of products of Fourier terms of a time derivative brightness of one said pixel and complex conjugate Fourier terms of another pixel.

8. A method of fire detection as recited in claim 1, wherein said conversion of said brightness value bitmaps to said matrix involves computing for any pair of pixels in said brightness value bitmaps a sum of a product of non-zero Fourier terms of a brightness value of one said pixel and complex conjugate Fourier terms of a brightness value of another pixel performed over a prescribed range of terms.

9. A method of fire detection as recited in claim 1, wherein said clusters having a measurable size, and further comprising the step of triggering said alarm means when one of said clusters has exceed a prescribed size.

10. An apparatus for fire detection within a monitored area, said apparatus comprising:
   a means for detecting and capturing, at a prescribed frequency, video images of said area,
   a means for converting said captured images into two-dimensional brightness value bitmaps of temporally varying brightness values observed in said images, wherein a spatial resolution of said bitmaps being determined by a number of pixels comprising said bitmaps,
   a means for converting said brightness value bitmaps into a two-dimensional matrix of temporal similarities between variations of the brightness values captured at each of said pixels and variations of the brightness values captured at a pixel that is adjacent to said pixel for each pixel in said brightness value bitmap and over a prescribed time period, and
   a means for analyzing said matrix to identify clusters of pixels that have temporal similarities whose values are above a prescribed threshold value,
   wherein said prescribed threshold value is set so as to identify those clusters of pixels that correspond to regions of said monitored area whose temporal variations in adjoining pixel brightness values indicate that the source of said temporal brightness variations is a fire in said monitored area.

11. An apparatus for fire detection as recited in claim 10, wherein said conversion of said brightness value bitmaps to said matrix involves computing for any two pixels in said brightness value bitmaps a convolution of a time derivative of the brightness values of said pixels.

12. An apparatus for fire detection as recited in claim 10, wherein said conversion of said brightness value bitmaps to said matrix involves computing for any pair of pixels in said brightness value bitmaps a sum across a prescribed number of samples of products of brightness differences of said pixels in successive bitmaps.

13. An apparatus for fire detection as recited in claim 10, wherein said conversion of said brightness value bitmaps to said matrix involves for any pair of pixels in said brightness value bitmaps a timed-averaged sum of products of brightness differences of said pixels in successive bitmaps.

14. An apparatus for fire detection as recited in claim 10, wherein said conversion of said brightness value bitmaps to said matrix involves computing for any pair of pixels in said brightness value bitmaps a sum across a prescribed number of samples of products of differences in current brightness value and a time-averaged brightness value of said pixels.

15. An apparatus for fire detection as recited in claim 10, wherein said conversion of said brightness value bitmaps to said matrix involves computing for any pair of pixels in said brightness value bitmaps the time-averaged sum of products of differences in current brightness value and the time-averaged brightness value of the said pixels.

16. An apparatus for fire detection as recited in claim 10, wherein said conversion of said brightness value bitmaps to said matrix involves computing for any pair of pixels in said brightness value bitmaps a sum of products of Fourier terms of a time derivative brightness of one said pixel and complex conjugate Fourier terms of another pixel.

17. An apparatus for fire detection as recited in claim 10, wherein said conversion of said brightness value bitmaps to said matrix involves computing for any pair of pixels in said brightness value bitmaps a sum of a product of non-zero Fourier terms of a brightness value of one said pixel and complex conjugate Fourier terms of a brightness value of another pixel performed over a prescribed range of terms.

18. An apparatus for fire detection as recited in claim 10, wherein said clusters having a measurable size, and further comprising a means for issuing an alarm that signifies when one of said clusters has exceed a prescribed size.

* * * * *